United States Patent
Slater et al.

(10) Patent No.: US 7,082,497 B2
(45) Date of Patent: Jul. 25, 2006

(54) SYSTEM AND METHOD FOR MANAGING A MOVEABLE MEDIA LIBRARY WITH LIBRARY PARTITIONS

(75) Inventors: Alastair Michael Slater, Malmesbury (GB); Mark Robert Watkins, Sneyd Park (GB); Andrew Michael Sparkes, Bishopston (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 772 days.

(21) Appl. No.: 10/034,083

(22) Filed: Dec. 28, 2001

(65) Prior Publication Data

US 2003/0126361 A1    Jul. 3, 2003

(51) Int. Cl.
G06F 13/00    (2006.01)

(52) U.S. Cl. .................... 711/114; 711/100; 711/154

(58) Field of Classification Search ............... 711/103, 711/112, 114, 151, 154, 173, 100, 54; 369/13.37, 369/47.1
See application file for complete search history.

(56) References Cited

U.S. PATENT DOCUMENTS

| | | |
|---|---|---|
| 5,070,404 A | 12/1991 | Bullock et al. |
| 5,164,909 A | 11/1992 | Leonhardt et al. |
| 5,303,214 A | 4/1994 | Kulakowski et al. |
| 5,367,669 A | 11/1994 | Holland et al. |
| 5,416,914 A | 5/1995 | Korngiebel et al. |
| 5,442,771 A | 8/1995 | Filepp et al. |
| 5,455,409 A | 10/1995 | Smith et al. |
| 5,613,154 A | 3/1997 | Burke et al. |
| 5,615,345 A | 3/1997 | Wanger |
| 5,734,859 A | 3/1998 | Yorimitsu et al. |
| 5,802,278 A | 9/1998 | Isfeld et al. |
| 5,805,864 A | 9/1998 | Carlson et al. |
| 5,819,309 A | 10/1998 | Gray |
| 5,835,940 A | 11/1998 | Yorimitsu et al. |
| 5,867,335 A | 2/1999 | Ozue et al. |
| 5,867,736 A | 2/1999 | Jantz |
| 5,883,864 A * | 3/1999 | Saliba .................. 360/92 |
| 5,890,014 A | 3/1999 | Long |
| 5,943,688 A | 8/1999 | Fisher et al. |
| 5,970,030 A | 10/1999 | Dimitri et al. |
| 6,038,490 A | 3/2000 | Dimitri et al. |
| 6,044,442 A | 3/2000 | Jesionowski |
| 6,052,341 A | 4/2000 | Bingham et al. |
| 6,084,736 A | 7/2000 | Kurokawa et al. |

(Continued)

FOREIGN PATENT DOCUMENTS

EP    0 859 308    8/1998

(Continued)

OTHER PUBLICATIONS

"Sharing Backup Resources," Ralph Cuellar; Apr. 2000.

(Continued)

*Primary Examiner*—Tuan V. Thai

(57) ABSTRACT

In one embodiment, the present invention is directed to a system for managing a moveable media library. The system may comprise at least one robotic mechanics and a controller. The controller may comprise a processor for executing instructions and non-volatile memory for storing at least: code for controlling the at least one robotic mechanics; and code for responding to commands received from host systems to retrieve a moveable medium of a plurality of moveable media, the code for responding is operable to receive the commands addressed with multiple device identifiers according to a device access protocol, and the code for responding is operable to associate each device identifier of the multiple device identifiers with at least one respective library partition.

23 Claims, 2 Drawing Sheets

U.S. PATENT DOCUMENTS

| | | | |
|---|---|---|---|
| 6,085,123 | A | 7/2000 | Baca et al. |
| 6,247,096 | B1 | 6/2001 | Fisher et al. |
| 6,295,578 | B1 | 9/2001 | Dimitroff et al. |
| 6,328,766 | B1 | 12/2001 | Long |
| 6,335,927 | B1 | 1/2002 | Elliott et al. |
| 6,336,163 | B1 | 1/2002 | Brewer et al. |
| 6,336,172 | B1 | 1/2002 | Day, III et al. |
| 6,421,196 | B1 | 7/2002 | Takayama et al. |
| 6,421,711 | B1 | 7/2002 | Blumenau et al. |
| 6,425,059 | B1 | 7/2002 | Basham et al. |
| 6,446,141 | B1 | 9/2002 | Nolan et al. |
| 6,502,162 | B1 | 12/2002 | Blumenau et al. |
| 6,507,896 | B1 | 1/2003 | Sanada et al. |
| 6,519,678 | B1 | 2/2003 | Basham et al. |
| 6,535,964 | B1 | 3/2003 | Sanada et al. |
| 6,574,667 | B1 | 6/2003 | Blumenau et al. |
| 6,606,664 | B1 | 8/2003 | Darago et al. |
| 6,618,796 | B1 | 9/2003 | Yamakawa et al. |
| 6,636,958 | B1 | 10/2003 | Abboud et al. |
| 6,681,303 | B1 | 1/2004 | Watanabe et al. |
| 6,725,394 | B1 * | 4/2004 | Bolt .............................. 714/7 |
| 6,731,625 | B1 | 5/2004 | Eastep et al. |
| 6,799,255 | B1 | 9/2004 | Blumenau et al. |
| 6,850,380 | B1 | 2/2005 | Basham et al. |
| 2001/0044877 | A1 | 11/2001 | Kanazawa et al. |
| 2002/0194294 | A1 | 12/2002 | Blumenau et al. |
| 2003/0065882 | A1 * | 4/2003 | Beeston et al. ............. 711/111 |

FOREIGN PATENT DOCUMENTS

| | | |
|---|---|---|
| EP | 0859308 | 8/1998 |
| EP | 0 881 560 | 12/1998 |
| EP | 0 978 841 | 2/2000 |
| EP | 1 039 410 | 9/2000 |
| EP | 1 158 386 | 11/2001 |
| EP | 1156408 | 11/2001 |
| JP | 09185465 | 7/1997 |
| JP | 10269026 | 10/1998 |
| JP | 2001014257 | 1/2001 |
| JP | 2002304791 | 10/2002 |

OTHER PUBLICATIONS

"The Gator Tape Library Family Architecture," John Kranz; Oct. 1999.

"Fibre Channel Fundamentals," Tom Weimer.

"Spectra 12000 User Guide," Sep. 2000.

Foreign Search Report dated Feb. 13, 2003.

IBM Technical Disclosure Bulletin, "Optical Disk Drive Loader for Work Station with Pluggable Magazine", vol. 38, No. 12, Dec. 1955, pp. 243-246.

IBM Technical Disclosure Bulletin, "Logical Grouping of Data Storage Media in a Library System", vol. 35, No. 5, Oct. 1992—pp. 17-20.

Massiglia, P., "The Raid Book", 6th edition, Feb. 1997, 83 pages.

European Search Report issued for EP 02 25 8778 dated Sep. 23, 2005.

European Search Report issued for EP 02 25 8774 dated Sep. 23, 2005.

European Search Report issued for 02 25 8807 dated Sep. 28, 2005.

Anonymous: "Veritas Volume Manager Administrator's Guide" Internet Article, Online! Aug. 2001; XP 002340475; pp. 53-90; pp. 223-240.

* cited by examiner

SYSTEM AND METHOD FOR MANAGING A MOVEABLE MEDIA LIBRARY WITH LIBRARY PARTITIONS

CROSS-REFERENCE TO RELATED APPLICATIONS

This application is related to commonly assigned U.S. Patent entitled "SYSTEM AND METHOD FOR INTERMEDIATING COMMUNICATION WITH A MOVEABLE MEDIA LIBRARY UTILIZING A PLURALITY OF PARTITIONS," filed Dec. 28, 2201 and issued as U.S. Pat. No. 6,845,431, which is incorporated herein by reference

TECHNICAL FIELD

The present invention is in general related to mass data storage and more specifically to managing a moveable media library with library partitions.

BACKGROUND OF THE INVENTION

Digital magnetic tape is commonly used for long-term data storage in computer systems. The low cost-per-bit stored, long-term retention capability, and portability of magnetic tape cartridges have made magnetic tape the medium of choice for storing the large quantities of data generated by businesses such as insurance companies, banking organizations, airlines, and the like.

Tape cartridges are frequently utilized by automated tape library peripherals. Tape libraries generally handle numerous tape cartridges to store very large amounts of data. The tape libraries hold the tape cartridges in predefined positions or media slots. When content is required from a particular tape cartridge, a host system communicatively coupled to the tape library communicates with a robotics subsystem controller of the tape library. The host system may be communicatively coupled to the tape library by a number of mechanisms. For example, the host system may be communicatively coupled to the tape library via a Small Computer System Interface (SCSI) bus or a Fibre Channel fabric. The host system may communicate a command to the robotics subsystem controller to retrieve the particular tape cartridge from the respective position or media slot. In response, the robotics subsystem controller may execute various mechanical operations by robotic mechanics to retrieve the desired tape cartridge and place the desired tape cartridge into a tape drive. The host system may typically communicate with the tape drive utilizing a communication path independent of the communication path to the robotics subsystem controller. The host system may then read from or write to the tape cartridge via the tape drive.

Additionally, other communication may occur between the host system and the robotics subsystem controller. For example, the host system may query the robotics subsystem controller to determine the number of tape cartridges, tape drives, and robotics mechanisms contained in the tape library associated with the robotics subsystem. By querying the robotics subsystem controller in this manner, the host system may manage the tape library.

Although tape libraries are useful for providing a significant amount of long-term data storage capacity, tape libraries possess several disadvantages. For example, the data storage capacity may be allocated for use by several entities. Accordingly, all of the data storage capacity may be accessible by each host system or entity communicatively coupled to the tape library. To address this problem, partitioning has been utilized. Partitioning involves assigning specific tape library resources (e.g., various slots, tape drives, robotic mechanics) to discrete virtual devices. Access to the virtual devices is then restricted as desired for particular applications.

Different approaches may be utilized to partition a tape library. First, host system restrictions have been utilized to restrict access to portions of a tape library for partitioning applications. Such host restrictions are implemented by a mediating software process on a host system to enforce partition restrictions. However, this approach is problematic. Specifically, the approach is undesirable if the tape library is utilized in a storage service provider environment. In storage service provider environments, the tape library and the host systems belong to different entities (e.g., the storage service provider and the customers). Placement of software mediating processes on host systems is unattractive, because it increases the burden on the customers to make use of the storage service. Also, corporate environments impose relatively long qualification cycles for new host system software. Moreover, many customers are unwilling to allow other parties to place software on their host systems. Additionally, the software mediating process approach is typically incompatible with existing data back-up utilities, i.e., the software mediating process approach requires the use of specialized data back-up applications.

A second approach, used by Spectra Logic, provides multiple bridge devices to partition tape libraries into multiple virtual devices. Each bridge device includes a Quad Interface Processor (QIP) to implement partitioning. The QIPs are processor-based card devices that serve as the sole interface between a host system and a library. By configuring each of the QIPs via a software interface, the QIPs are capable of emulating several virtual libraries that appear to be multiple physical libraries to a host system or host systems. Each QIP typically includes two Small Computer System Interface (SCSI) buses and up to two tape drives may be coupled to each SCSI bus.

Although this architecture does provide a mechanism to implement partitioning in a manner that is somewhat transparent to host systems this architecture is problematic. Specifically, it is costly and hardware-intensive in that it requires multiple processor-based cards. Second, the use of multiple hardware bridges introduces multiple points of failure, thereby increasing the probability of that data may become inaccessible. Moreover, this hardware approach rigidly controls the addition of further resources to a given partition. There is a specific structural relationship between the bridging hardware and the addition of further resources to a partition. Accordingly, the hardware approach is not amenable to the creation of multiple smaller partitions or applicable to partitioning smaller tape libraries.

BRIEF SUMMARY OF THE INVENTION

In one embodiment, the present invention is directed to a system for managing a moveable media library. The system may comprise at least one robotic mechanics and a controller. The controller may comprise a processor for executing instructions and non-volatile memory for storing at least: code for controlling the at least one robotic mechanics; and code for responding to commands received from host systems to retrieve a moveable medium of a plurality of moveable media, the code for responding is operable to receive the commands addressed with multiple device identifiers according to a device access protocol, and the code for responding is operable to associate each device identifier of the multiple device identifiers with at least one respective library partition.

DETAILED DESCRIPTION OF THE INVENTION

Figure 1:
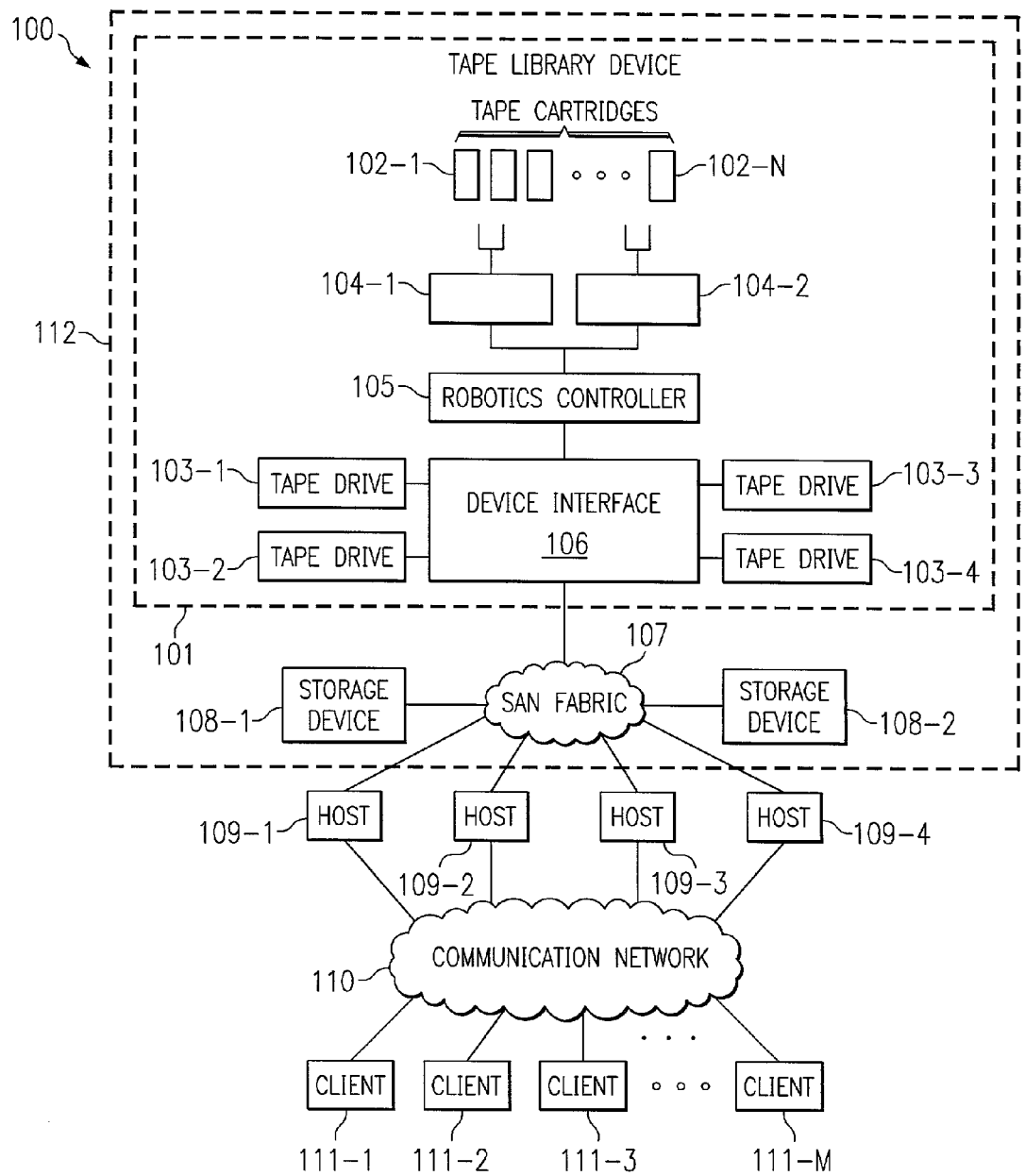
FIG. 1 depicts an exemplary storage area network environment including a tape library according to embodiments of the present invention.

The present invention is related to a system and method for partitioning the system resources of a moveable media library such as a tape library. In embodiments of the present invention, a system resource table is utilized which maps certain system resources (moveable media, tape drives, robotic mechanics, and/or the like) to partitions. A robotics controller is utilized to implement the partitioning as will be discussed in greater detail with respect to FIG. 2. The robotics controller may enforce the partitioning scheme by limiting access to a defined subset of library resources on a per host system basis. For example, the robotics controller may control the tape drives to cause the tape drives to only communicate with a selected host system or host systems.

Additionally, the robotics controller provides multiple instances of itself to a host system or host systems, i.e., the robotics controller appears to be multiple virtual devices to the host system or host systems. To provide multiple instances of itself, the robotics controller may utilize multiple physical interfaces and/or multiple logical interfaces. For example, a Fibre Channel switch may be utilized to route commands addressed with a plurality of Fibre Channel World Wide Names (WWNs) to the robotics controller as will be discussed with respect to FIG. 3. Even though the robotics controller is only a single device, the robotics controller may appear to be multiple devices by responding to commands addressed with the plurality of WWNs. The robotics controller may provide multiple logical versions of itself utilizing, for example, Small Computer System Interface (SCSI) logical units (LUNs) as will be discussed with respect to FIG. 4. Accordingly, the robotics controller may execute code for responding to commands received from a host system or host systems addressed with the multiple communication medium addresses or identifiers. In the event that multiple requests are made of a same physical hardware element (e.g., a robotic mechanics), the multiple requests may be queued using a first in, first executed basis. Also, each communication medium address or identifier may be associated with at least one partition or virtual device.

Moreover, the robotics controller may execute code responsive to received commands to generate a response that utilizes a particular communication medium address or identifier depending on the host system that generated the received command. The robotics controller may determine the particular host system that generated the received command by the originating address or port. The code responsive to received commands may access a table to obtain the communication medium address or identifier that corresponds to a respective host system.

By partitioning resources in this manner, allocation of the storage capacity of a moveable media library may be achieved without appreciable difficulty. The storage capacity of a moveable media library may be shared among independent organizations. Access to another organization's data is preferably prevented by the partitioning scheme. Moreover, no modifications are required to be made to a host system or host systems according to preferred embodiments. A library administrator need only configure the moveable media library by assigning specific resources to respective partitions. Additionally, partitioning via the robotics controller does not require multiple costly bridge devices or rigidly restrict the scalability of partitions. Moreover, it shall be appreciated that such an allocation of library resources among various partitions is quite advantageous for storage area network, directly attached storage, directly attached shared storage, and network attached shared storage environments.

To demonstrate a particular environment in which embodiments of the present invention may be utilized, reference is now made to FIG. 1. FIG. 1 depicts exemplary system 100 that comprises exemplary tape library 101. System 100 comprises host systems 109-1 through 109-4 which facilitate access to data storage on storage area network (SAN) 112. Storage area network 112 comprises SAN fabric 107, storage devices 108-1 and 108-2, and tape library 101. Storage devices 108-1 and 108-2 may be any type of suitable storage device including disk arrays, JBODs (Just a bunch of disks), optical media players, and/or the like. In exemplary system 100, host systems 109-1 through 109-4 may dynamically store and retrieve information from storage devices 108-1 and 108-2. Host systems 109-1 through 109-4 may execute back-up utility applications to back-up data stored on storage devices 108-1 and 108-2 on tape library 101. Alternatively, storage devices 108-1 and 108-2 may execute back-up operations without intervention by host systems 109-1 through 109-4.

SAN fabric 107 provides a communication fabric to facilitate communication among storage devices 108-1 and 108-2, tape library 101, and host systems 109-1 through 109-4. SAN fabric 107 is typically implemented utilizing a Fibre Channel architecture. Fibre Channel is typically utilized due to the simplicity of its communication path, i.e., Fibre Channel utilizes a serial communication scheme. Additionally, Fibre Channel provides data communication at relatively high rates (e.g., 1064 Mbps) over either copper and/or optical fiber cables. Copper cables are generally utilized when various storage devices 108 are separated from host systems 109-1 through 109-4 by intra-cabinet connections. Optical cables may support separation distances up to 500 meters from a device to a hub (a Fibre Channel interconnection unit within SAN fabric 107) and up to 10 kilometers between hubs. Fibre Channel further utilizes various communication topologies such as point-to-point, arbitrated loop, and star topologies. Fibre Channel also encapsulates or supports various communication protocols such as Small Computer System Interface (SCSI) and Internet Protocol (IP) protocols. Devices that do not support Fibre Channel can be coupled to a Fibre Channel fabric via a bridge device. Specifically, numerous commercially-available bridge devices (such as Hewlett-Packard Company SURESTORE SCSI BRIDGE FC 4/1) allow a SCSI device to be deployed on a SAN that employs a Fibre Channel fabric. Although Fibre Channel is typically utilized for SAN fabric 107, other communication mechanisms may be utilized. For example, it is frequently appropriate to perform remote mirroring operations to redundantly store mission-critical data at remote locations. For such operations, asynchronous transfer mode (ATM) network elements or leased-lines (T-1, OC-12, and/or the like) may be employed.

Clients 111-1 through 111-M may communicate with host systems 109-1 through 109-4 via communication network 110. Communication network 110 may comprise any number of communication media, such as ATM, wireless, and/or leased-line links. By communicating with host systems 109-1 through 109-4, clients 111-1 through 111-M may obtain data stored on the storage area network 112. For example, clients 111-1 through 111-M may possess operating systems which are configured to access network drives through host systems 109-1 through 109-4. The network drives implemented by host systems 109-1 through 109-4 may manage various files on storage devices 108-1 and 108-2 and tape library 101.

Host systems 109-1 through 109-4 may discover the presence of tape library 101 in storage area network 112 by querying robotics controller 105. Peripheral or device discovery is typically performed by sending a query message to each possible device address within a device address range. For example, in the SCSI protocol, a query command may be issued to a peripheral by addressing the command to a SCSI identifier (e.g., a bus address and/or a logical unit). The peripheral associated with the SCSI identifier will respond by communicating pertinent identification information such as LUN path information, vendor identification, product identification, serial number and product revision pursuant to the SCSI protocol. It shall be appreciated that host systems 109-1 through 109-4 may discover tape drives 103-1 through 103-4 independently of robotics controller 105. However, robotics controller 105 may advantageously direct tape drives 103-1 through 103-4 to associate with a virtual library or partition in response to discovery protocols. For example, robotics controller 105 may control tape drives 103-1 through 103-4 to cause tapes drives 103-1 through 103-4 to only communicate with selected ones of host systems 109-1 through 109-4.

After host systems 109-1 through 109-4 determine that robotics controller 105 is a device that controls tape operations for tape library 101 by examining the vendor identification and product identification information, host systems 109-1 through 109-4 may communicate additional query commands. Host systems 109-1 through 109-4 may query robotics controller 105 to determine the number of tape cartridges 102-1 through 102-N, tape drives 103-1 through 103-4, robotic mechanics 104-1 and 104-2, and/or the like in tape library 101. By receiving the device information through device discovery and subsequent queries, host systems 109-1 through 109-4 may control tape library 101 via communication with robotics controller 105.

Host systems 109-1 through 109-4 may issue appropriate commands to robotics controller 105 to obtain a particular tape cartridge 102 from a media element (e.g., a tape slot or tape drive). In response, robotics controller 105 may retrieve the particular tape cartridge 102 by utilizing one of robotic mechanisms 104-1 and 104-2. The particular robotic mechanics 104 may be physically translated to the tape element of the particular tape cartridge 102. The robotic mechanics 104 may grasp the particular tape cartridge 102. The robotic mechanics 104 may then place the particular tape cartridge 102 in one of tape drives 103-1 through 103-4.

Interface device 106 allows tape drives 103-1 through 103-4 and robotics controller 105 to be communicatively coupled to SAN fabric 107. Device interface 106 may be, for example, a Fibre Channel device to allow SCSI devices to be connected to SAN fabric 107. Device interface 106 may be implemented to route multiple Fibre Channel WWNs to robotics controller 105 to allow robotics controller 105 to present multiple instances of itself. If implemented as a Fibre Channel device, device interface 106 may allow each of tape drives 103-1 through 103-4 and robotics controller 105 to be connected in parallel to SAN fabric 107, i.e., the devices may not be required to share the same SCSI bus. Host systems 109-1 through 109-4 may execute a data transfer to or from the particular tape cartridge 102 by utilizing a communication path associated with SAN fabric 107. Although tape library 101 is depicted as having tape drives 103-1 through 103-4 directly coupled to device interface 106, the present invention is not so limited. For example, the data transfers may occur by communicating data through robotics controller 105 before routing data to tape drives 103-1 through 103-4.

The type of configuration depicted in FIG. 1 is referred to as a storage area network for several reasons. First, the data transfers or communication related to data storage is preferably isolated from communication between host systems 109-1 through 109-4 and clients 111-1 through 111-M. Secondly, there is preferably no single point of failure within storage area network 112. SAN fabric 107 preferably provides redundant connections via hubs, switches, routers, and/or the like. Additionally, multiple host systems (e.g., 109-1 through 109-4) are preferably utilized.

The configuration utilized by storage area networks is quite advantageous. First, the storage is placed behind host systems 109-1 through 109-4. Data transfers, for example, between tape library 101 and host systems 109-1 through 109-4 do not occur over the same communication network as data transfers between host systems 109-1 and clients 111-1 through 111-M. By placing the data transfers associated with stored data behind host systems 109-1 through 109-4, overall system performance can be significantly enhanced. Moreover, the configuration of storage area network 112 is robust in that the probability of failure is greatly minimized, because there is no single point of failure. Additionally, numerous additional data storage devices 108 or tape libraries 101 may be added to system 100 without appreciable difficulty by coupling respective devices to SAN fabric 107. Accordingly, storage area network 112 is advantageously scalable. It shall be appreciated that storage area network 112 may be located at any location, i.e., it is not required to be located on the premises of an organization that utilizes its storage capacity. Additionally, storage area network 112 may be advantageously managed by a separate entity from the organizations that utilize its storage capacity.

It shall be appreciated that the advantages of storage area network 112 cause the cost per bit of storage capacity to be significantly reduced as compared to other storage schemes. However, the vast amount of storage capacity made available by storage area network 112 can exceed the storage requirements of many organizations. Accordingly, multiple organizations may share the storage capacity of storage area network 112 by utilizing data warehousing. By using data warehousing, each organization is capable of reaping the benefit of the reduced cost of data storage.

However, data warehousing presents several unique challenges. First, it is important to ensure that an organization does not access data that belongs to another organization. For example, certain tapes 102 of tape library 101 may be belong to a specific organization to store back-ups of its mission-critical data. In a data warehousing scheme, other organizations should not be able to issue a command to robotics controller 105 to retrieve these tapes, so as to prevent access or damage to the mission-critical data.

According to embodiments of the present invention, robotics controller 105 is adapted to facilitate data warehousing in a manner that provides data integrity. In a first mode, robotics controller 105 acts in the same manner as an ordinary robotics controller 105. In the first mode, robotics controller 105 will respond to any of host systems 109-1 through 109-4 according to appropriate commands. However, in a second mode, robotics controller 105 may be configured by a system administrator to act as two or more different virtual devices. In this second mode, host systems 109-1 through 109-4 detect multiple device instances associated with tape library 101. Each device instance is assigned a subset or portion of the system resources of tape library 101, i.e., tape library resources are partitioned among the various device instances. Moreover, each host system of host systems 109-1 through 109-4 may only access the device instances according to various permissions. Specifically, the device instances may be addressed on a per-host basis to protect the integrity of the stored data.

Figure 2:
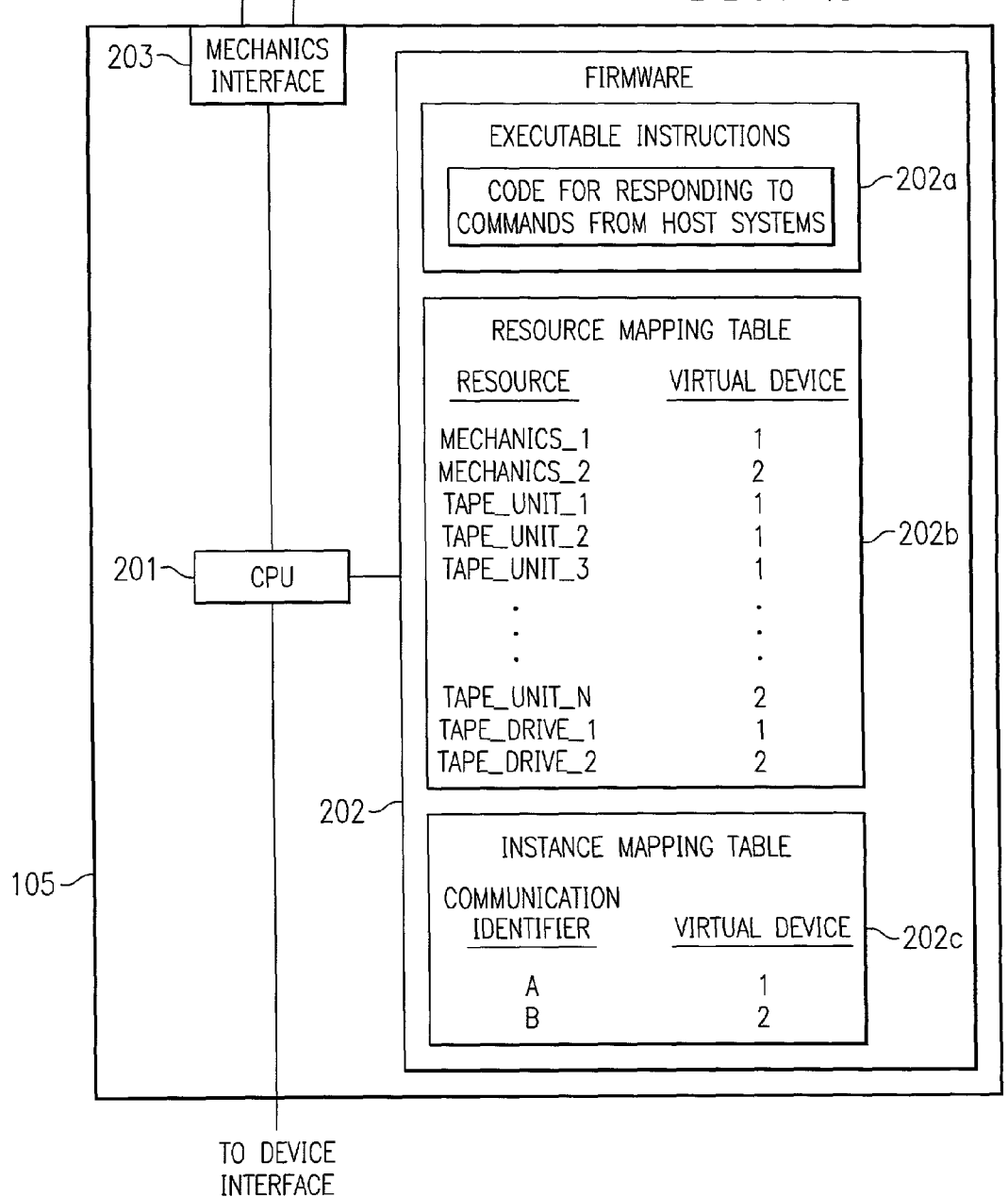
FIG. 2 depicts an exemplary robotics controller according to embodiments of the present invention.

FIG. 2 depicts an exemplary implementation of robotics controller 105. Robotics controller 105 comprises CPU 201. Any suitable processor may be utilized for CPU 201. Robotics controller 105 may comprise mechanics interface 203 to communicate with and control robotic mechanics 104-1 and 104-2. Robotics controller 105 may also be coupled to device interface 106 (see FIG. 1). Device interface 106 allows robotics controller 105 to communicate with other systems including host systems 109-1 through 109-4.

Robotics controller 105 may also comprise firmware 202. Firmware 202 may be implemented utilizing non-volatile memory elements including, but not limited to, PROM, EPROM, EEPROM, and the like. Firmware 202 may retain executable instructions 202a that define the operations of robotics controller 105 according to embodiments of the present invention. As previously noted, various communication protocols provide a mechanism to enable detection or discovery of devices coupled to a communication medium or network. The communication protocols may cause a device to return a predetermined message in response to a query message or packet. Pursuant to suitable device access protocols (e.g., SCSI, Fibre Channel, Simple Network Management Protocol (SNMP), or the like), executable instructions 202a may include code to identify robotics controller 105 to allow host systems 109-1 through 109-4 to issue appropriate drive commands. In the event that multiple drive commands are received that relate to a same physical hardware element (e.g., a robotic mechanics), the multiple commands may be queued using a first in, first executed basis. To accommodate queueing of data or commands, a relatively large buffer (not shown) may be utilized.

Additionally, executable instructions 202a may include code that is responsive to issue such identification information pursuant to multiple device addresses or identifiers. Executable instructions 202a may include code for accessing instance mapping table 202c. Instance mapping table 202c may associate communication medium addresses or identifiers with virtual devices. Moreover, executable instructions 202a may include code for responding to query commands received from host systems 109-1 through 109-4 according to the communication medium addresses or identifiers. For example and without limitation, the code may issue the identification information for three different Fibre Channel addresses to define three virtual devices. By responding to device identification queries addressed to multiple device addresses or identifiers, robotics controller 105 provides multiple instances of itself to host systems 109-1 through 109-4. The multiple instances of robotics controller 105 are utilized to implement the virtual devices in a manner that is transparent to host systems 109-1 through 109-4.

Moreover, the multiple connections or interfaces may be associated with respective virtual devices. For example and without limitation, device interface 106 may include a Fibre Channel switch. Alternatively, device interface 106 may be coupled to a Fibre Channel switch of SAN fabric 107. By utilizing a Fibre Channel switch, communication data routed to multiple Fibre Channel addresses may be routed to robotics controller 105. Robotics controller 105 may be configured to associate the multiple addresses with respective virtual devices or partitions. By associating Fibre Channel addresses with virtual devices, robotics controller 105 may cause each virtual device to appear as a distinct physical device attached to SAN fabric 107. Accordingly, embodiments of the present invention may cause the partitioning to be transparent to host systems 109-1 through 109-4. It shall be appreciated that the present invention is not limited to utilizing Fibre Channel switches. Multiple interfaces may be associated with virtual devices in accordance with other communication mechanisms. For example, embodiments of the present invention may associate SCSI logical units (LUNs) with each partition if desired.

Figure 3:
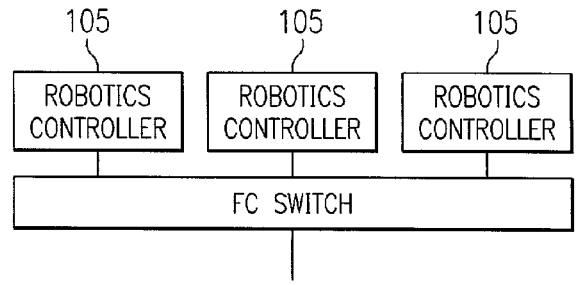
FIG. 3 depicts an exemplary view of a robotics controller as seen by host systems according to embodiments of the present invention.
Figure 4:
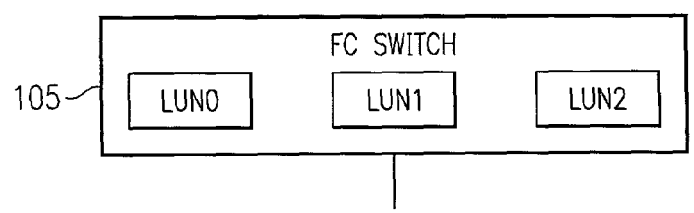
FIG. 4 depicts another exemplary view of a robotics controller as seen by host systems according to embodiments of the present invention.

FIG. 3 depicts multiple instances of robotics controller 105 utilizing a Fibre Channel switch as viewed by host systems 109-1 through 109-4. Even though robotics controller 105 is actually a single device, host systems 109-1 through 109-4 "see" three distinct devices. Also, FIG. 4 depicts robotics controller 105 as viewed by host systems 109-1 through 109-4 when robotics controller 105 provides multiple instances via logical interfaces (e.g., LUNs).

Returning to FIG. 2, firmware 202 may include resource mapping table 202b to enforce the partitioning scheme. Resource mapping table 202b may be utilized to assign resources (e.g., robotic mechanics 104-1 and 104-2, tape drives 103-1 through 103-4, and/or tape cartridges 102-1 through 102-N) of tape library 101 to particular virtual devices. For example, robotic mechanics 104-1 may be assigned to virtual_device_1 by the mechanics_1 record of resource mapping table 202b. Likewise, tape drive 103-1 may be assigned to virtual_device_1 by tapeunit_1 record of resource mapping table 202b. Although resource mapping table 202b has been described as being stored in firmware 202, the present invention is not so limited. Resource mapping table 202b may be stored in non-volatile memory at any location that is accessible to robotics controller 105. Resource mapping table 202b may be configured utilizing a number of techniques. For example, resource mapping table 202b may be configured via input from a manual interface or a software interface located at a remote system by a library administrator.

It shall be appreciated that certain library resources may be assigned to one or more partitions or virtual devices. For example, robotic mechanics 104-1 and 104-2 may be shared by virtual devices. Multiple requests to a shared library resource may be queued using a first in, first executed basis.

The code for partitioning may access resource mapping table 202b, when one of host systems 109-1 through 109-4 attempts to determine the system resources associated with a virtual device. For example, host system 109-1 may attempt to determine the resources are associated with virtual_device_1 of tape library 101 by issuing an appropriate command that is addressed with a particular SCSI identifier, Fibre Channel address, SNMP identifier, or the like of virtual_device_1. Robotics controller 105, by executing the code for partitioning, may examine whether host system 109-1 is permitted to access virtual_device_1. The determination whether access is permitted to occur may be implemented by ordinary device and/or file permissions that are well known in the art. The determination may also be made by using LUN masking as is known in the art. If host system 109-1 is permitted access, robotics controller 105 may examine resource mapping table 202b. Robotics controller 105 may construct a response message identifying robotic mechanics 104-1, tape drives 103-1 and 103-2, and tape cartridges 102-1 through 102-10, for example, as belonging to virtual_device_1.

After obtaining information regarding the resources of virtual_device_1, host system 109-1 may access data stored on tape cartridges 102-1 through 102-10. Host system 109-1 may issue a command to robotics controller 105 to retrieve tape cartridge 102-1 and to place the tape cartridge in tape drive 103-1. After tape cartridge 102-1 is placed in tape drive 103-1, host system 109-1 may issue appropriate commands to tape drive 103-1 to initiate data transfers associated with files stored on tape cartridge 102-1.

In a similar manner, code for partitioning may access resource mapping table 202b when one of host systems 109-1 through 109-4 attempts to determine the resources associated with a different virtual device. However, the tape cartridges associated with, for example, virtual_device_2 may be tape cartridges 102-{N minus 20} to tape cartridge 102-N. Typically, tape media such as tape cartridges 102-1 through 102-N are bar-coded or identified by a chip with in the cartridge which is read by a "wand" unit to identify the tape media. A suitable wand unit may be disposed on the media picker element of robotic mechanics 104-1 and 104-2. The code for partitioning may perform a renumbering in a response message to a resource identification query. In this case, the code for partitioning may return a message identifying virtual cartridge identifiers 1 through 20. Robotics controller 105 would then map virtual cartridge identifiers 1 through 20 to tape cartridges 102-{N minus 20} to tape cartridge 102-N when responding to commands to retrieve various cartridges from their respective slots of virtual_device_2. By performing such renumbering, the virtual devices may be transparent, i.e., the virtual devices may appear to be completely separate devices. Of course, any other resource of a virtual device may be renumbered in a similar manner.

It shall be appreciated that the code for partitioning prevents host systems 109-1 through 109-4 from accessing system resources that are not assigned to virtual devices that host systems 109-1 through 109-4 are allowed to access. Specifically, if one of host systems 109-1 through 109-4 attempts to determine the system resources associated with a virtual device that it does not possess authorization to access, robotics controller 105 will not respond or may response negatively (i.e., a "no such device" message). Additionally, robotics controller 105 may enforce the partitioning by instructing tape drives 103-1 through 103-4 to only communicate with a selected one or ones of host systems 109-1 through 109-4. Accordingly, a host system will not be capable of issuing commands to access library resources that belonging to a virtual device of another host system.

It shall be appreciated that all resources of tape library 101 (e.g., tape cartridges 102-1 through 102-N, tape drives 103-1 through 103-4, robotic mechanics 104-1 and 104-2, and the like) need not be assigned at any particular point in time.

Specifically, it may be advantageous to provide a greater number of resources than necessary at a particular time. When an organization outgrows the data storage capacity of its originally configured virtual device, the virtual device may be reconfigured to include some of the unassigned resources. For example, resource mapping table 202b may be modified by assigning additional tape cartridges of tape cartridges 102-1 through 102-N to virtual_device_1 to increase the storage capacity of virtual_device_1. By configuring tape library 101, the data storage capability of each virtual device may be scaled without appreciable difficulty.

By utilizing tape library 101 in storage area network 112 and operating robotics controller 105 to partition the library resources, allocation of storage capacity may be achieved in an efficient manner. Specifically, the cost of acquiring a tape library may be shared by allocating system resources on a per host basis. Accordingly, the reduced cost per bit of data storage capacity associated with a large tape library may benefit entities that only require a moderate amount of storage capacity. Additionally, the environment of system 100 is advantageous if host systems 109-1 through 109-4 are owned by different entities. In particular, robotics controller 105 may implement the desired partitioning of resources in a manner that is transparent to each of host systems 109-1 through 109-4. Host systems 109-1 through 109-4 are not required to possess any specialized software to access their respective virtual devices or partitions. Moreover, host systems 109-1 through 109-4 are not permitted to access the resources that do not belong to them.

Although FIGS. 1 and 2 have been described with respect to operation in a storage area network, it shall be appreciated that the present invention is not so limited. Moveable media libraries according to embodiments of the present invention may be utilized in directly attached storage, directly attached shared storage, and network attached shared storage environments as examples. Moveable media libraries may also be utilized for corporate intranets where various partitions are assigned to respective corporate departments. In fact, embodiments of the present invention may be utilized in any mass storage environment that may utilize partitioning to allocate library resources to a host system or host systems.

Additionally, it shall be appreciated that the present invention is not limited to associating exactly one partition with one physical interface or virtual device. The partitioning may also provide the ability to allow more logical partitions than physical devices, i.e., one interface may support multiple partitions. In this instance, the back-up application scheduling by host systems may advantageously implement a policy that decreases conflicts in virtual device access.

Although preferred embodiments of the present invention partition tape libraries, the present invention is not so limited. Partitioning according to the present invention may be utilized by any library peripheral that comprises moveable media. For example, partitioning according to the present invention may be employed by CD-ROM or DVD library peripherals.

Embodiments of the present invention possess several advantages. Embodiments allow either large or small libraries to be partitioned to allocate storage capacity to a number of entities. Embodiments of the present invention are easily scalable, because any number of discrete library resources may be allocated to any particular partition as desired. Additionally, embodiments of the present invention provide partitioning in a manner that is transparent to host systems. Host systems do not require additional software or other modifications to store data on library partitions according to embodiments of the present invention. Embodiments of the present invention further provide greater reliability and reduced costs, because separate hardware processing cards are not required to interface with various partitioned devices.

The invention claimed is:

1. A system for managing a moveable media library, said system comprising:
   at least one robotic mechanics; and
   a controller, said controller comprising a processor for executing instructions and non-volatile memory for storing at least:
      code for controlling said at least one robotic mechanics; and
      code for responding to commands received from host systems to retrieve a moveable medium of a plurality of moveable media, said code for responding is operable to receive said commands addressed with multiple device identifiers according to a device access protocol, and said code for responding is operable to associate each device identifier of said multiple device identifiers with at least one respective library partition.

2. The system of claim 1 wherein said at least one robotic mechanics is operable to retrieve a moveable medium of a plurality of moveable media and to place said moveable medium into one of a plurality of media elements.

3. The system of claim 1 wherein said device access protocol is Fibre Channel and wherein said multiple device identifiers are Fibre Channel addresses.

4. The system of claim 3 further comprising:
   a Fibre Channel switch that is operable to route Fibre Channel packets addressed with said multiple device identifiers to said controller.

5. The system of claim 1 wherein said device access protocol is a Small Computer System Interface (SCSI) protocol.

6. The system of claim 5 wherein said multiple device identifiers are SCSI logical units (LUNs).

7. The system of claim 1 wherein said non-volatile memory further comprises:
   code for accessing a resource mapping table that assigns library resources to a respective library partition.

8. The system of claim 7 wherein said resource mapping table is stored in said non-volatile memory.

9. The system of claim 1 wherein said non-volatile memory further comprises:
   code for identifying a respective virtual robotics mechanism peripheral in response to a device identification query addressed with each of multiple device identifiers pursuant to said device access protocol.

10. A method for managing a moveable media library, said method comprising:
    assigning resources of said moveable media library to partitions of a plurality of partitions;
    assigning at least one partition of said plurality of partitions to each communication medium identifier of a plurality of communication medium identifiers;
    receiving a device access command, at a robotics controller, from a host system addressed with one of said plurality of communication identifiers; and
    determining a partition of said plurality of partitions utilizing said one of said plurality of communication medium identifiers.

11. The method of claim 10 wherein said plurality of communication medium identifiers are Fibre Channel addresses.

12. The method of claim 10 wherein said plurality of communication medium identifiers are Small Computer System Interface (SCSI) identifiers.

13. The method of claim 10 wherein said step of determining comprises:
    accessing a resource mapping table that assigns library resources to respective library partitions.

14. The method of claim 13 wherein said resource mapping table is stored in non-volatile memory of said robotics controller.

15. The method of claim 11 wherein said device access command is a device identification query, and said method further comprising the step of:
    generating a device identification response according to resources assigned to the determined partition of said plurality of partitions.

16. The method of claim 10 wherein said device access command is a command to retrieve a virtual moveable medium, said method further comprising:
    determining a physical moveable medium corresponding to said virtual moveable medium according to said determined partition.

17. A system for managing a tape library, said system comprising:
    a robotics subsystem operable to retrieve tape cartridges and to place tape cartridges into tape elements;
    a robotics controller said robotics controller comprising:
       a processor for executing code;
       code for receiving a command to access a resource of said tape library, wherein said command is addressed with a communication medium identifier;
       code for determining a partition of a plurality of partitions utilizing said communication medium identifier; and
       code for controlling said robotics subsystem utilizing at least said determined partition.

18. The system of claim 17 wherein said command to access a resource is received from a host system, and wherein said robotics controller further comprises:
    code for determining whether said host system is authorized to access resources associated with said determined partition.

19. The system of claim 17 wherein said robotics controller receives two commands requesting access to a same resource, and wherein said robotics controller further comprises:
    code for queueing received commands until a requested resource becomes available.

20. The system of claim 17 further comprises:
    a resource mapping table, wherein said resource mapping table maps system resources to partitions of said plurality of partitions.

21. The system of claim 20 wherein said robotics controller further comprises non-volatile memory, and wherein said resource mapping table is stored in said non-volatile memory.

22. The system of claim 17 further comprising:
    a Fibre Channel switch, wherein said Fibre Channel switch is operable to route a plurality of messages associated with a plurality of Fibre Channel addresses to said robotics controller, and wherein each of said plurality of Fibre Channel addresses are associated with at least one partition of said plurality of partitions.

23. A controller for managing a moveable media library, said controller comprising:

a processor for executing instructions; and non-volatile memory for storing at least:

code for controlling at least one robotic mechanics of a moveable media library; and code for responding to commands received from host systems to retrieve a moveable medium of a plurality of moveable media of said moveable media library, said code for responding is operable to receive said commands addressed with multiple device identifiers according to a device access protocol, and said code for responding is operable to associate each device identifier of said multiple device identifiers with at least one respective library partition.

* * * * *